United States Patent
Hagen et al.

(10) Patent No.: US 11,708,474 B2
(45) Date of Patent: Jul. 25, 2023

(54) METHOD FOR SOLVENT REMOVAL FROM A POLYMER SOLUTION BY INTEGRATED DRUM-DRYING AND EXTRUSION

(71) Applicant: APK AG, Merseburg (DE)

(72) Inventors: Hanel Hagen, Leipzig (DE); Wohnig Klaus, Berlin (DE)

(73) Assignee: APK AG, Merseburg (DE)

( * ) Notice: Subject to any disclaimer, the term of this patent is extended or adjusted under 35 U.S.C. 154(b) by 43 days.

(21) Appl. No.: 17/394,683

(22) Filed: Aug. 5, 2021

(65) Prior Publication Data

US 2022/0041834 A1    Feb. 10, 2022

(30) Foreign Application Priority Data

Aug. 7, 2020  (EP) .................................... 20190065

(51) Int. Cl.
| | | |
|---|---|---|
| *C08J 11/08* | (2006.01) | |
| *B29B 17/02* | (2006.01) | |
| *C08J 5/18* | (2006.01) | |
| *B29K 101/12* | (2006.01) | |

(52) U.S. Cl.
CPC .............. *C08J 11/08* (2013.01); *B29B 17/02* (2013.01); *C08J 5/18* (2013.01); *B29B 2017/0293* (2013.01); *B29K 2101/12* (2013.01); *C08J 2323/06* (2013.01)

(58) Field of Classification Search
CPC ............ C08J 11/08; C08J 11/02; Y02W 30/62
USPC ......................................................... 528/47
See application file for complete search history.

(56) References Cited

FOREIGN PATENT DOCUMENTS

| EP | 3339361 A1 | * | 6/2018 |
| UA | 93427 | * | 2/2011 |
| WO | WO2017136765 | * | 12/2021 |

OTHER PUBLICATIONS

UA93427 machine translation Liudmyla et al. (Year: 2011).*

* cited by examiner

*Primary Examiner* — Terressa Boykin
(74) *Attorney, Agent, or Firm* — Millen White Zelano & Branigan, PC; Brion P. Heaney

(57) ABSTRACT

The invention relates to a continuous method for removing a solvent from a suspension or solution comprising a dissolved target polymer by integrated drum-drying and extrusion of said suspension or solution comprising the dissolved target polymer. The invention also relates to a plastic waste recycling system for recycling a target polymer. Furthermore, the invention also relates to a polymer material obtained by this recycling method.

20 Claims, 2 Drawing Sheets

METHOD FOR SOLVENT REMOVAL FROM A POLYMER SOLUTION BY INTEGRATED DRUM-DRYING AND EXTRUSION

TECHNICAL FIELD

The present invention relates to a continuous method for removing a solvent from a suspension or solution comprising a dissolved target polymer by integrated drum-drying and extrusion of said suspension or solution comprising the dissolved target polymer. The present invention also relates to a method for solvent-based recycling of a plastic material comprising at least one target polymer, comprising the integrated drum-drying and extrusion step. The invention also relates to a plastic waste recycling system for recycling a target polymer. Furthermore, the invention also relates to a polymer material obtained by this recycling method.

BACKGROUND OF THE INVENTION

It is well known that plastic has an impact on the environment, largely because plastic is in general not biodegradable. Each year, millions of tons of plastic objects, such as plastic bags, pellets and plastic bottles, end up in the water, including oceans, and accumulate over time. Onshore plastic waste can be found even in the most remote regions. Plastic objects decompose very slowly and eventually form microplastics that may be sized in the submicrometer range, further facilitating widespread plastic pollution, and thus representing a serious environmental problem. Toxic chemicals, such as DDT (Dichlorodiphenyltrichloroethane) and BPA (Bisphenol A) have been found to adhere to microplastics, thus facilitating the spread of such toxic chemicals via the spread of microplastics. Plastic waste, in particular in the form of microplastics, represents a potential danger to animal life and to humans when inadvertently consumed as part of natural diet, comprising the consumption of meat and fish.

Plastic recycling offers a sustainable way of controlling the amount of plastic in circulation, and reducing the amount of plastic waste that is effectively produced and released into the environment. For this purpose, various mechanisms of recycling plastic waste have been developed over time.

DE 44 14 750 A1 relates to a process and an apparatus for cleaning viscose polymer melts possibly contaminated with paper, the impurities being segregated from the polymer melt by centrifuging.

EP 0 894 818 A discloses a process for the reclamation of soluble polymer or polymer mixtures from waste materials wherein (i) the polymer or polymer mixture is selectively dissolved from the polymeric material; (ii) unwanted insoluble components are optionally removed from the resulting solution; (iii) unwanted soluble components are optionally removed from solution; (iv) the polymer or polymer mixture is selectively precipitated by means of turbulent mixing with a precipitating agent in the presence of a gas or gas mixture; (v) separation of the precipitated polymer or polymer mixture from the liquid phase; and (vi) optionally drying the polymer or polymer mixture. Preferably further soluble polymer or mixture is dissolved from the separated insoluble components after separation from the resulting suspension and/or the insoluble components undergo a final water washing step. The polymer solution undergoes a chromatographic, preferably a gel permeation chromatography and/or solid phase extraction, preferably with carbon and/or a liquid-liquid extraction step.

DE 40 33 604 A1 relates to a recovery of soluble plastics from waste, wherein the plastic to be recovered is selectively dissolved out of the plastic-containing waste by suitable solvents. The thus obtained solution is injected into a container filled with a medium which is a non-solvent for the plastic. The temperature of this medium must in this case be above the boiling point of the solvent in which the plastic was dissolved. As a result, the solvent evaporates and the plastic to be recovered is released. The evaporated solvent is recovered. The precipitation of the plastic shall be quantitative in that one injects the plastic solution in a very high excess of a non-solvent for this plastic.

WO 2018/114046 A1 discloses a centrifuge for separating at least one solid from a waste material suspension, the suspension comprising the solid and a polymer solution with at least one solvent and at least one plastic dissolved therein.

US 2007/0265361 A1 relates to a method for recycling polyesters or polyester mixtures from polyester-containing waste, in which the polyester or the polyester mixture is dissolved in a solvent and subsequently free-flowing particles are precipitated therefrom with a precipitant. The precipitant is chosen such that subsequent separation of precipitant and solvent is made possible in a simple manner.

US 2008/0281002 A1 relates to a method for recycling plastic materials which contain at least two polymers, copolymers or blends thereof based on polystyrene. The plastic material is thereby mixed with a solvent for the polymers, copolymers or blends. Subsequently a precipitation is effected by addition of a corresponding precipitant so that then the gelatinous precipitation product can be separated from the further components of the plastic material. The method is used for recycling of any plastic materials, in particular of plastic materials from electronic scrap processing and from shredder light fractions.

WO 2011/082802 A1 relates to a method of recycling waste material comprising at least one polymer and at least one material to be separated, in which a) at least one swelling agent is added to form a polymer gel, and b) at least one insoluble impurity is separated from the polymer gel by means of filtration or sedimentation.

WO 2017/003804 A1 discloses a process for purifying polyethylene, wherein impurities from the polymer matrix are removed via extraction without dissolving the plastic material.

U.S. Pat. No. 5,043,421 discloses solvent removal from solutions comprising polymers in an extruder by addition of at least one non-solvent during extrusion.

DE 10 2013 210 110 A1 discloses a method comprising the enrichment of a polylactide from waste comprising a polylactide, wherein the polylactide is in solution, and wherein the solvent is at least partially removed by use of a degassing extruder.

WO 1999/043744 A1 discloses the recovery of substantially pure polymers from aqueous solutions. A membrane filtration step is used in said method for the purpose of removing impurities, such as certain salts and/or metals.

WO2012117250A1 discloses a recycling process for obtaining polypropylene, comprising a decontamination process, and extrusion of dissolved target polymer in an extruder, wherein the solvent is at least partially removed by use of evaporation in a vacuum in the extruder, as well as heating.

U.S. Pat. No. 5,740,617 discloses a rotary drum-dryer used for transforming an aqueous slurry into a dry firm product having a uniform particle size in the range of about 0.1 to 2 cm.

JPS5827801 discloses evaporation to dryness of a dissolved polymer that was obtained by de novo polymerization, on a drum-dryer, wherein the dry polymer film obtained by drum-drying is cut off from the drum dryer and rolled up, which in turn enables dropping/separation from the drum, and prevents cooling down, of the rolled-up polymer, thus maintaining dried polymer flexibility that is useful for conveyor-belt driven transfer and processing of rolled-up polymer in an extruder.

Many recycling techniques are solvent-based methods, wherein the target polymer is transferred to a solution and dissolved before being recovered from said solution by polymer recovery methods known in the prior art, comprising, but not limited to, solvent evaporation and/or precipitation, wherein some methods may be selective towards a certain group of polymers or a single target polymer.

However, the recovery of dissolved target polymers from a solution may represent another challenge. Evaporation or precipitation processes may consume a lot of energy, and therefore may not be sustainable and/or economically favorable, and thus unlikely to contribute to the reduction of plastic waste through sustainable recycling methods. For example, sustained or excessive heating may destabilize the target polymers.

Another problem is that the polymer recovery process from a solution may comprise a number of steps that are discontinuous, or are batch processes, wherein batch process refers to a batch-by-batch transfer of a target polymer, as opposed to a continuous transfer of polymer through a process without any interruptions in time and/or space. For example, a polymer that has been recovered from a solution has to be fully dried before being transferred to and processed in an extruder for production of plastic products, such as plastic pellets. In some cases the dried polymer first has to be removed from the drying device before being introduced into the extruder, which, if the transfer is not continuous, may lead to significant loss of time and energy. A fully continuous process transforms solvent removal and plastic extrusion into a single, integrated step, thus providing a more energy-efficient way of plastic production from a dissolved target polymer.

Considering the worldwide production of several hundred million tons of plastic each year, even small energy reductions in the recycling process may thus have a large impact and lead to substantially increased recycling efficiency and/or throughput, and sustainability of recycling methods.

Another problem is that polymers exposed to high temperatures during a prolonged heat-induced solvent evaporation, e.g. above 180° C., tend to be partially damaged. In particular, polymer chains are more frequently broken under extreme heat, thus leading to the reduction of an average molecular weight and randomizing of its distribution instead of having a molecular weight in a constant range. The target polymer is further affected by chemical decomposition due to thermal instability.

The present invention provides a method of solvent removal using a drum-drying under vacuum of the dissolved target polymer integrated with extrusion in a plastic extruder. This integrated method of solvent removal from a dissolved target polymer and extrusion surprisingly improves the energy profile of the solvent removal process, whilst further also providing an improved method for continuous integration into a sustainable recycling process. Compared to an extruder, particularly because of the better surface-to-volume ratio, the drying process in the drum dryer is more gentle and more efficient.

The evaporation in the drum-drier is conducted under reduced pressure. This allows keeping the evaporation temperature lower than under normal pressure, thus preventing the target polymer from decomposition.

DETAILED DESCRIPTION OF THE INVENTION

It is an object of the present invention to provide an improved method for solvent removal from a suspension or solution comprising a dissolved target polymer, particularly a dissolved thermoplastic target polymer by drum-drying of a target polymer that is in a suspension or solution, comprising continuous transfer of the dried target polymer to a plastic extruder.

Thus herein is provided a continuous method for removing at least one solvent from a liquefied form comprising a dissolved target polymer, wherein said method comprises the following steps:

evaporating at least one solvent from said liquefied form in a drum-dryer comprising at least one heated rotary drum, wherein said liquefied form contacts a shell surface of the at least one heated rotary drum at a temperature of up to 75° C. at a pressure of <500 mbar, and wherein a drum-dryer dried film comprising the target polymer is produced at the shell surface of the at least one heated rotary drum, detaching the drum-dryer dried film from the shell surface of the at least one heated rotary drum, and transferring the detached drum-dryer dried film from the drum-dryer to an extruder through a vacuum seal between the drum-dryer and the extruder.

The drum-drying of a target polymer that is in a suspension or solution may optionally be complemented with degassing, wherein optionally degassing is performed with a degassing extruder.

The method enables solvent removal from a suspension or solution comprising the target polymer by at least reducing the time span and/or temperature of the heat-induced solvent evaporation, thereby reducing the loss of target polymer through decomposition of polymers by thermal instability that would occur if solvent removal were conducted by prolonged heat-induced evaporation, possibly at high temperatures, for example above 180° C. This is achieved by spreading the dissolved target polymer over the large surface of a drum dryer, thereby obtaining a film that is rapidly evaporated under moderate heating and vacuum. The drum-dryer dried film is then continuously transferred to the plastic extruder for extrusion. Avoiding prolonged heat-induced evaporation by applying the reduced pressure helps to obviate additional stressing and decomposition of the target polymer.

It is also subject of the present invention to provide an improved method of solvent removal from a suspension or solution comprising a dissolved target polymer, for integration into a complete plastic recycling process, thereby improving the overall energy efficiency of the complete plastic recycling process, and thus running costs, which in turn may also increase recycling throughput. It is also an object of the present invention to provide an improved plastic waste recycling system for recycling plastic waste comprising a target polymer. Such an improved plastic waste recycling system comprises a plastic recycling plant with multiple processing stations, wherein the solvent removal station or integrated solvent removal step is according to the subject matter of the present invention.

It is herein provided an improved method for solvent removal from a solution or suspension comprising a dissolved target polymer, wherein the solvent removal step occurs under vacuum and at temperatures that are less detrimental to target polymers, wherein the temperatures used depend on the pressure used while evaporation is taking place.

The method further provides a solvent removal step that uses a drum-dryer for formation of thin films of dissolved target polymer thereby significantly expediting the process of evaporation under vacuum and low temperatures.

The temperatures used for evaporation are kept as low as possible, and in some embodiments are <180° C., preferably <150° C., more preferably <120° C., more preferably <100° C., more preferably <75° C., even more preferably <65° C., more preferably at ambient temperature, most preferably at room temperature.

The pressures used for evaporation are kept as low as possible, and in some embodiments are <1000 mbar, preferably <500 mbar, more preferably <300 mbar, more preferably <100 mbar, most preferably <20 mbar.

Combinations of pressure, temperature and speed during the drum-drying process can be adjusted to prevent melting of the target polymer and maximize target polymer quality, throughput and energy efficiency. For instance, the rotating speed of the rotary drums may be 10 rpm or less. The material to be dried may be in contact with the rotary drums for a period of time of a few minutes, possibly one minute or less. An output of at least 300 kg per hour may be achieved in the overall process, including the drum drying and extruding processes, for instance with the pressures and temperatures set forth in detail below. In terms of a proportion of 10% dissolved target polymer in the solution of suspension this corresponds to an input of 3000 kg per hour into the drum dryer.

The form of dissolved target polymer provided to the drum-dryer comprising a solution or suspension is herein referred to as "liquefied form".

In particular, provided is a method for removing a solvent from a liquefied form comprising a dissolved target polymer and at least one organic solvent, wherein said method is a continuous method, comprising evaporating a solvent from said liquefied form under vacuum that is a pressure of <500 mbar, preferably <300 mbar, while the liquefied form contacts the shell surface of a heated rotary drum or a plurality of heated rotary drums of a drum-dryer, wherein heated means a temperature of up to 75° C. at <500 mbar, particularly up to 65° C. at <300 mbar. Thereby a drum-dryer dried film comprising the target polymer is produced at the shell surface of a heated rotary drum or a plurality of heated rotary drums of a drum-dryer. The drum-dryer dried film, which is an essentially solvent-free polymer mass comprising the target polymer is then detached from the shell surface of a heated rotary drum or a plurality of heated rotary drums. Here, essentially solvent-free means preferably <3 wt % solvent, more preferred <1 wt % solvent. The detached drum-dryer dried film is then continuously transferred from the drum-dryer to an extruder for extrusion, wherein, during the continuous transfer of the detached drum-dryer dried film from the drum-dryer to the extruder the detached drum-dryer dried film provides a vacuum seal between the drum-dryer and the extruder.

By producing a vacuum seal between the drum-dryer and the extruder by means of the detached drum-dryer dried film a continuous process is provided in which a drum-dryer can be continuously operated under vacuum and an extruder under ambient or over pressure can used to convey the dried polymer mass directly from the drum dryer. This is essentially achieved by melting up the polymer mass after the drying process during transfer to the extruder, which may include melting before entering the extruder and/or melting after entering the extruder. The thereby produced melt forms the vacuum seal by closing or substantially closing a transfer region between the drum-dryer and the extruder in a plug-like manner. Thus, it is not necessary to open the drum dryer for transferring the dried polymer mass to the extruder, which would break the vacuum. Thus, the vacuum in the drum dryer can be maintained or at least substantially maintained even if the extruder is operated at a higher pressure without interrupting the process. In some embodiments, said method comprises the following steps:

(i) providing a liquefied form comprising a dissolved target polymer and at least one organic solvent to the drum-dryer that is under vacuum through an inlet opening of the drum-dryer;

(ii) contacting the liquefied form of step i) with a heated drum or a plurality of heated drums of the drum-dryer;

(iii) rotating the heated drum or plurality of heated drums of the drum-dryer, thus providing a rotary heated drum or plurality of rotary heated drums of the drum-dryer contacting the liquefied form of step ii), thereby under heating and vacuum producing a drum-dryer dried film at the shell surface of a heated rotary drum or plurality of heated rotary drums of the drum-dryer;

(iv) contacting the drum-dryer dried film of step iii) with a blade at the shell surface of the rotary heated drum or plurality of rotary heated drums, thereby detaching the drum-dryer dried film from the shell surface of the rotary drums or plurality of rotary drums;

(v) continuously transferring the detached drum-dryer dried film of step iv) to an outlet opening of the drum-dryer, wherein the outlet opening of the drum-dryer is continuous with the inlet opening of an extruder, thereby enabling continuous supply of the detached drum-dryer dried film of step iv) to the extruder;

(vi) extruding the detached drum-dryer dried film of step v) in the extruder.

In one embodiment, the continuous transfer of the detached drum-dryer dried film, to the extruder is facilitated by means of a guiding mechanism that continuously directs the detached drum-dryer dried film from the drum-dryer shell surface into the extruder.

In some embodiments, the guiding mechanism comprises the use of a guiding surface that is juxtaposed to the blade such that said guiding surface contacts and directs the detached drum-dryer dried film to the outlet opening of the drum-dryer that is downstream with the inlet opening of the extruder.

A blade beveled up to 20° can be used along the entire length of the drums to detach the drum dryer dried film from the drum-dryer shell surface. The distance between the blade and drum may be in the range <100 μm, preferably <10 μm. The blade may be variably adjustable, particularly over almost the entire roll circumference. If the detached polymer material forms a film that tends to roll up as described above, a blunt plate is preferably used for guiding the material. The distance between the drum and such plate is larger than that to blade, i.e. >100 μm. This means that the film detached by the blade and guides by the plate is guided and does not have to fall off under its own weight.

In one embodiment, the liquefied form is additionally purified, in particular by means of mechanical solid-liquid separation, optionally using a centrifuge, thereby obtaining a purified liquefied form.

It was surprisingly discovered that integrating a drum-drying step comprising with an extrusion step, and/or optionally a degassing step optionally comprising a degassing extruder, reduces energy consumption and/or duration of the recycling process such that the resulting overall recycling process allows a higher throughput of recycled plastic, thus allowing more efficient plastic recycling, which in turn more efficiently addresses the problem of plastic pollution. The integration of both extrusion and drum-drying, optionally combined with degassing, substantially reduces running time and costs, while maximizing the efficiency of solvent removal and effectively reducing the need for solvent evaporation at high temperatures.

It was surprisingly discovered that integrating a drum-drying step comprising with an extrusion step, wherein the evaporation of the solvent is conducted under reduced pressure, and/or optionally a degassing step optionally comprising a degassing extruder, reduces energy consumption and/or duration of the recycling process, hence avoiding additional stressing of the target polymer, such that the resulting overall recycling process allows a higher throughput of recycled plastic, thus allowing more efficient plastic recycling, which in turn more efficiently addresses the problem of plastic pollution.

If vaporization takes place in the extruder, the energy almost comes from the electric drive. The drum dryer, however, uses almost only thermal energy. The drum drives themselves can be neglected compared to that. The fact that electric drives have an efficiency factor and electrical energy is also generated with an efficiency factor means that at least 30% of energy can be saved. With regard to product damage, a considerably lower influence can also be expected. Thus virgin-like quality is more likely to be achieved with the process of the present invention e.g. compared to extruding alone.

The above steps i) to vi) do not necessarily signify a specific sequence or number of steps. However, preferably the steps of the method are implemented with ascending numbers, i.e. in the order as shown above.

In one embodiment, step i) is preceded by dissolving at least part of the target polymer. According to some embodiments, adding a solvent or a mixture of solvents to plastic material comprising the target polymer in order to obtain a solution or suspension comprising said target polymer is achieved by dissolving the target polymer at an elevated temperature. In one embodiment, said elevated temperature may be above room temperature, preferably above 40° C., but may be even higher and may depend on the specific combination of polymer and solvent as set forth in more detail below. For example, for polyethylene (PE), in particular low-density polyethylene (LDPE), heptane was found to be a particularly suitable solvent, in particular at 85 to 95° C. For polyethylene (PE), in particular high-density polyethylene (HDPE), heptane was found to be a particularly suitable solvent, in particular at 105 to 115° C. For polypropylene (PP) octane was found to be particularly suitable solvent, in particular at an average temperature of 125 to 135° C. For PVC acetone was found to be a particularly suitable solvent, in particular at an average temperature of 80 to 160° C. For polyamide (PA), in particular polyamide-6, propylene glycol was found to be a particularly suitable solvent, preferably at an average temperature of 80 to 160° C.

In one embodiment, the plastic waste comprising the target polymer is at least partially dissolved in the solvent, in particular using an agitator and/or a heating system.

In one embodiment, the method for removing a solvent is for recycling plastic waste comprising a target polymer, and the plastic waste comprising the target polymer is at least partially dissolved in the solvent, in particular using an agitator and/or a heating system.

According to some embodiments adding a solvent or a mixture of solvents to said plastic material to obtain a solution or suspension comprising said target polymer comprises dissolving said target polymer at least partially in said solvent or said mixture of solvents in a, in particular closed and/or gastight, vessel comprising the solvent, wherein an agitator for stirring the suspension or solution is provided. The agitator may be connected to said vessel and/or it may be disposed in said vessel. It is in some embodiments possible to dispose the agitator within the vessel without connection to the vessel, e.g. by hanging the agitator into the vessel from above. However, often the agitator is connected to the, in particular closed and/or gastight, vessel. The suspension or solution is preferably stirred for at least 15 min, in particular for at least 30 min Preferably, the suspension or solution is stirred for less than 6 h, in particular for less than 2 h (120 min). It was found that stirring expedites dissolving the target polymer in the solvent.

In one embodiment, the method for removing a solvent is for recycling plastic waste comprising a target polymer, wherein the target polymer is at least partially dissolved in the solvent, in particular using an agitator and/or a heating system. In another embodiment, the method for removing a solvent is for integration into a solvent-based recycling process. The solvent-based recycling process preferably is a continuous solvent-based recycling process.

In one embodiment, the extruder further comprises a degassing unit, wherein the degassing unit is used for essentially complete degassing of the target polymer, wherein essentially complete degassing means obtaining a target polymer wherein above 95 mass %, preferably above 99 mass % are solvent-free.

In one embodiment, the degassing unit is a degassing extruder. In one embodiment, the extruder is a screw extruder.

In one embodiment, the target polymer is at least partially dissolved in the solvent at a temperature that is lower by more than 5 K, in particular by more than 10 K than the boiling point of said solvent, or the organic solvent with the lowest evaporation temperature in a mixture of solvents.

In some embodiments the target polymer is a thermoplastic polymer. In some embodiments, the target polymer is derived from plastic material selected from the group comprising post-consumer use polymers, post-industrial use polymers and combinations thereof.

In some embodiments said thermoplastic polymer is selected from the group comprising polyolefins, polyamide (PA) and combinations thereof.

In some embodiments the target polymer is selected from the group consisting of polystyrene (PS), in particular expanded polystyrene (EPS), polyethylene (PE), polypropylene (PP), polyvinyl chloride (PVC), polyamide (PA), Styrene-acrylonitrile resin (SAN), acrylonitrile styrene acrylate (ASA), polyoxymethylene (POM), polybutylene terephthalate (PBT), polycarbonate (PC), acrylonitrile butadiene styrene (ABS) and polyethylene terephthalate (PET). A particularly suitable target polymer is polyethylene (PE), in particular low-density polyethylene (LDPE) and/or high-density polyethylene (HDPE).

In some embodiments the target polymer is selected from the group comprising polystyrene (PS), in particular expanded polystyrene (EPS), polyethylene (PE), polypropylene (PP), polyvinyl chloride (PVC), polyamide (PA), Styrene-acrylonitrile resin (SAN), acrylonitrile styrene acrylate (ASA), polyoxymethylene (POM), polybutylene terephthalate (PBT), polycarbonate (PC), acrylonitrile butadiene styrene (ABS) and polyethylene terephthalate (PET). A particularly suitable target polymer is polyethylene (PE), in particular low-density polyethylene (LDPE) and/or high-density polyethylene (HDPE). The method was found to be particularly suitable for recycling low-density polyethylene (LDPE).

In one embodiment, the target polymer is a polyolefin. In one embodiment, the target polymer is low-density polyethylene (LDPE). In one embodiment, the target polymer is polypropylene (PP). In one embodiment, the target polymer is polyamide (PA).

The suspension or solution provided in the above mentioned step i) preferably comprises one or more at least partially dissolved thermoplastic target polymers selected from the group consisting of polystyrene (PS), in particular expanded polystyrene (EPS), polyethylene (PE), polypropylene (PP), polyvinyl chloride (PVC), polyamide (PA), Styrene-acrylonitrile resin (SAN), acrylonitrile styrene acrylate (ASA), polyoxymethylene (POM), polybutylene terephthalate (PBT), polycarbonate (PC), acrylonitrile butadiene styrene (ABS) and polyethylene terephthalate (PET). Polyethylene (PE) is preferably selected from high-density polyethylene (HDPE) and low-density polyethylene (LDPE) or contains both. The method was found to be particularly suitable for recycling polyethylene (PE), in particular low-density polyethylene (LDPE).

In some embodiments the target polymer has an average molecular mass of 50 to 20000 kDa, in particular of 100 to 4000 kDa, in particular preferred of 200 to 2000 kDa. In some embodiments the target polymer has a number average molecular weight of 50 to 20000 kDa, in particular of 100 to 4000 kDa, in particular preferred of 200 to 2000 kDa.

In one embodiment, the solvent or mixture of solvents in which the target polymer is dissolved, form a solution or suspension that is saturated with the dissolved target polymer.

In some embodiments the target polymer is dissolved in said solvent or said mixture of solvents in an amount not less than 5 wt %, more preferably not less than 7 wt %, in particular not less than 10 wt %, with respect to the total weight of said solvent or mixture of solvents and the polymer that is dissolved.

In some embodiments the target polymer is dissolved in said solvent or said mixture of solvents in an amount not less than 5 wt %, more preferably not less than 7 wt %, in particular not less than 10 wt %, with respect to the total weight of said solvent or mixture of solvents and the polymer that is dissolved, wherein said solvent or mixture of solvents in which the target polymer is dissolved, form a solution or suspension that is saturated with the dissolved target polymer. Besides the target polymer, other non-target polymers may be present. Preferably non-target polymers do not dissolve in the solvent or have a lower solubility under said conditions than the target polymer. If for example plastic waste is recycled the non-target polymers are preferably present to a lesser degree than the target polymer. Preferably non-target polymers are dissolved in an amount of less than 1 wt %, in particular less than 0.5 wt %, with respect to the total weight of the solvent and the polymer that is dissolved.

It is preferred if the suspension or solution is heated to an average temperature above 20° C., in particular to an average temperature above room temperature of 25° C., in particular preferred to an average temperature of more than 40° C.

In some embodiments, the suspension or solution has an average temperature of at least 50° C., in particular of at least 80° C. In some embodiments during dissolving of the target polymer in the solvent, the solvent is heated to an average temperature of 20 to 160° C., in particular of 40 to 140° C., preferably of 50 to 100° C. In some embodiments, the suspension or solution is heated to an average temperature of 60 to 180° C., which is dependent on the solvent as will be understand by a person skilled in the art. For instance, heptane as the solvent requires relatively low temperatures to evaporate. However, using heptane fo HDP or PP, an overpressure may be required for solving. For low-density polyethylene (LDPE) as a target polymer an average temperature of 80 to 120° C. was found to be particularly suitable for dissolving said polymer. For high-density polyethylene (HDPE) as a target polymer an average temperature of 100 to 140° C. was found to be particularly suitable for dissolving said polymer. For polypropylene (PP) as a target polymer an average temperature of 120 to 160° C. was found to be particularly suitable for dissolving said polymer. In some embodiments the average temperature in the above described vessel of the suspension or solution, in particular when dissolving the target polymer, is above 20° C., preferably above 40° C., in particular above 60° C., in particular preferred above 80° C. This may also be the average temperature of the suspension or solution in said vessel comprising said solvent or suspension. In some embodiments, dissolving the target polymer is conducted under temperature which is lower by more than 5 K, in particular by more than 10 K than the boiling point of said solvent.

In some embodiments the peak temperature of the suspension or solution, in particular when dissolving the target polymer, is above 20° C., preferably above 40° C., in particular above 60° C., in particular preferred above 80° C. This may also be the peak temperature of the solvent and/or suspension or solution in said vessel comprising said solvent or suspension. It is to be understood that the average temperature is preferably selected in such a way that a most—if not all—of the target polymer is dissolved and/or remains dissolved in said solvent.

In some embodiments purifying said suspension or solution comprises removing undissolved components of said suspension or solution by mechanical solid-liquid separation. In some embodiments the mechanical solid-liquid separation is achieved by a centrifuge. In some embodiments a sieve, in particular a metal sieve, may be used alternatively or additionally for mechanical solid-liquid separation.

In some embodiments said solid-liquid separation removes any particles that weigh more than 1000 mg, in particular more than 100 mg, preferably more than 10 mg. In some embodiments the solid-liquid separation removes any particles that weigh more than 50 mg, in particular more than 5 mg, preferably more than 1 mg. After solid-liquid separation the suspension preferably becomes a solution comprising the target polymer and solid particles.

In some embodiments the solid-liquid separation comprises removing at least 50% by weight, in particular at least 90% by weight, preferably 99% by weight, of any substances that have not been dissolved, preferably by centrifugation.

In some embodiments the centrifuge is a gastight centrifuge, in particular wherein the suspension may be centrifuged under gastight conditions. In some embodiments, solvent removal is performed under gastight conditions. In yet another embodiment, the recycling process is conducted under gastight conditions.

In some embodiments the oxygen content within the centrifuge is below 15% by weight, in particular below 10% by weight, preferably below 7% by weight, in particular preferred with respect to the total weight of the suspension within the centrifuge and/or with respect to the gas composition within the centrifuge. In some embodiments, the oxygen content within recycling process and/or the solvent removal process comprising drum-drying and extrusion is below 15% by weight, in particular below 10% by weight, preferably below 7% by weight, in particular preferred with respect to the total weight of the suspension within the centrifuge and/or with respect to the gas composition within the centrifuge.

In some embodiments, the solvent is a single organic solvent or a mixture comprising at least one organic solvent, preferably a mixture of two or more organic solvents.

In some embodiments, the solvent used to dissolve the target polymer is a single organic solvent or a mixture comprising at least one organic solvent, preferably a mixture of two or more organic solvents. In some embodiments, the solvent is a single organic solvent or a mixture of solvents comprising at least one organic solvent.

In some embodiments said organic solvents are aliphatic or aromatic hydrocarbons. In some embodiments, the solvent comprises aliphatic or aromatic hydrocarbons. They may be saturated or unsaturated. In some embodiments solvents comprise cyclic organic compounds. In one embodiment, solvents comprise organic acids comprising but not limited to formic acid and/or acetic acid. In one embodiment, the solvent comprises formic acid, acetic acid, ketones such as acetone or propanone and alcohols such as methanol or ethanol or polyols such as glycol or 2-propanol or mixtures thereof. In one embodiment, the solvent comprises formic acid, acetic acid, ketones such as acetone or propanone and alcohols such as methanol or ethanol or polyols such as glycol or 2-propanol, or mixtures thereof. The solvent is selected in such a way that the target polymer is dissolved. For polyethylene (PE), in particular low-density polyethylene (LDPE), heptane was found to be a particularly suitable solvent, in particular at 85 to 95° C. and/or at a pressure of 0.8 to 1.2 bar. For polyethylene (PE), in particular high-density polyethylene (HDPE), heptane was found to be a particularly suitable solvent, in particular at 105 to 115° C. and/or at a pressure of 1 to 2 bar. For polypropylene (PP) octane was found to be particularly suitable solvent, in particular at an average temperature of 125 to 135° C. For PVC acetone was found to be a particularly suitable solvent, in particular at an average temperature of 80 to 160° C. For polyamide (PA), in particular polyamide-6, propylene glycol was found to be a particularly suitable solvent, preferably at an average temperature of 80 to 160° C.

In some embodiments the solution or suspension in step i) contains 10 or more weight percent of said target polymer with respect to the total weight of said solvent or mixture of solvents and the polymer that is dissolved.

In some embodiments only a single target polymer is present. In other embodiments a blend of target polymers is produced and may be used for production of pellets.

The drum dryer used for drum-drying may be any drum-dryer known in the prior art that is suitable for carrying out the invention. Such drum dryers may have one or two heated rotary drums. The material to be dried can be supplied onto the rotary drum(s) ("active supply") or the rotary drum(s) may rotate immersing into a bath or solution to pick up the material ("passive supply").

In one embodiment, the drum-dryer comprises a plurality of rotary drums, the plurality of rotary drums comprises at least two counter-rotating drums constituting a linear slit along the outer shell surfaces of the counter-rotating drums, through which the liquefied form is transferred by the counter-rotation of said counter-rotating drums, thereby producing the drum-dryer dried film at the outer shell surface of the at least two counter-rotating drums.

In one embodiment, the linear slit has a width of ≤1000 μm, preferably 100 μm to 1000 μm, more preferably <300 μm.

In one embodiment, the width of the drum-dryer dried film is up to 100% of the total drum length, preferably up to 90% of the total drum length.

In one embodiment, the drum-dryer dried film has a width of ≤1000 μm, preferably <300 μm.

In one embodiment, the liquefied target polymer is transferred to the drum-dryer under vacuum, wherein the vacuum is not destabilized.

In one embodiment, the inlet opening of the drum-dryer comprises a seal, and wherein the seal stabilizes the pressure of the drum-dryer and is provided by means of at least one intermediate valve, wherein the at least one intermediate valve is connected to at least one vacuum pump. The intermediate valve is particularly used for establishing the vacuum at the beginning of the process until the dried polymer mass provides the vacuum seal between the drum-dryer and the extruder. The intermediate valve can then be opened and left open during the entire process.

In some embodiments in particular, the dried polymer mass falls off from the drum or drums into a trough and is further pressed into the screw channel of the extruder via its feeding screw. There the polymer mass is melted. Due to the design of the extruder screw a "jam zone" is built up by stuffing (i.e. compressing or densifying) the dried polymer mass, which forms a closure to seal the outlet opening of the drum-dryer to maintain the vacuum in the drum drier, particularly when starting the process. Once the polymer mass melts in the extruder, particularly in the first zone (metering zone) of the extruder, the melt also seals the outlet opening of the drum drier. Thus, in some embodiments, there may be substantially equal pressures in the drum drier and the extruder during the start of process if no additional intermediate valve is provided. Once the "valve" is formed by the stuffed polymer mass in the extruder screw and further by the polymer melt, a pressure difference between the drum drier and the extruder can be formed, particularly including a vacuum in the drum drier. The pressure difference may be e.g. at least 100 mbar.

In one embodiment, the liquefied form is a polymer suspension, melt or solution.

In one embodiment, the liquefied form is a polymer suspension or solution.

In one embodiment, the detached drum-dryer dried film is a dried gel-like polymer.

In one embodiment, the drum-dryer is heated, wherein heated means that the temperature of the drum or plurality of drums of the drum-dryer is 20K, preferably 10 K below the boiling point of the organic solvent, or the organic solvent with the lowest evaporation temperature in a mixture of solvents.

In one embodiment, the drum-dryer is heated, wherein heated means that the temperature of the drum or plurality of drums of the drum-dryer is 20K, preferably 10 K below the boiling point of the organic solvent, or the organic solvent with the lowest evaporation temperature in a mixture of solvents, wherein the temperature that is referred to is below the melting point of the target polymer and at working pressure. As the melting point of the target polymer is basically not or only little pressure dependent, the "working pressure" referred to here typically corresponds to normal pressure (atmospheric pressure). It will be appreciated, however, that the vacuum or under-pressure in the drum dryer aims at reducing the boiling point for the solvent according to its vapor pressure curve.

In one embodiment, drum speed is less than 10 rpm, preferably less than 5 rpm.

In one embodiment, the extruder is under pressure, and wherein said pressure is >30 bar, preferably >50 bar, most preferred >100 bar.

In one embodiment, the pressure in the extruder is achieved by a vacuum pumping system aided with heating.

In one embodiment, the method is for recycling plastic waste comprising a target polymer, wherein plastic waste comprising the target polymer is at least partially dissolved in the solvent comprising at least one organic solvent, in particular using an agitator and/or a heating system.

In one embodiment dissolving of the target polymer in a solvent is conducted under temperature which is lower by more than 5 K, in particular by more than 10 K than the boiling point of said solvent, or the organic solvent with the lowest evaporation temperature in a mixture of solvents.

In one embodiment, the target polymer is a thermoplastic target polymer.

In one embodiment, the target polymer is derived from plastic material selected from the group comprising post-consumer use polymers, post-industrial use polymers and combinations thereof.

In one embodiment, the target polymer is selected from the group comprising polyolefins, polyamide (PA) and combinations thereof.

In one embodiment, the target polymer is a polyolefin.

In one embodiment, the target polymer is low-density polyethylene (LDPE).

In one embodiment, the target polymer is polypropylene (PP).

In one embodiment, the target polymer is polyamide (PA).

In one embodiment, the solvent is a single organic solvent or a mixture of solvents comprising at least one organic solvent.

In one embodiment, the solvent or mixture of solvents comprises aliphatic or aromatic hydrocarbons.

In one embodiment, the solvent or mixture of solvents comprises formic acid, acetic acid, ketones such as acetone or propanone and alcohols such as methanol or ethanol or polyols such as glycol or 2-propanol or mixtures thereof.

In one embodiment, the target polymer is low-density polyethylene (LDPE) and the solvent is selected from the group comprising alkanes, iso-alkanes and cyclic alkanes, and wherein if the solvent of LDPE is an alkane, said alkane preferably is n-heptane.

In one embodiment, the target polymer is low-density polyethylene (LDPE) and the solvent is n-heptane or methyl cyclohexane.

In one embodiment, the target polymer is low-density polyethylene (LDPE) and the solvent is n-heptane.

In one embodiment, the target polymer is low-density polyethylene (LDPE) and the solvent is methyl cyclohexane.

In one embodiment, the target polymer is polypropylene (PP) and the solvent is n-nonane.

In one embodiment, the target polymer is polyamide (PA) and the solvent is propylene glycol.

In one embodiment, the method is for recycling plastic waste and is carried out in a plastic waste recycling plant.

In one embodiment, the solvent removal and extrusion step is part of a plastic recycling process.

In one embodiment, the solvent removal and extrusion step is part of a plastic recycling process that is conducted by means of a plastic waste recycling plant.

In one embodiment, the plastic waste recycling plant comprises the following stations:
A) optionally a station that comprises a downsizing device for plastic waste, that optionally is a cutting or shredding device for plastic waste, and optionally a plastic particle size classification device for classifying the downsized plastic waste;
B) optionally a station for washing the downsized, optionally classified plastic waste produced in station A.);
C) a station that comprises a vessel, wherein the vessel comprises an agitator and/or a heating system and/or an organic solvent for dissolving the at least one target polymer, optionally derived from the downsized plastic polymer, optionally the classified plastic waste produced in station A.), or the washed plastic waste produced in station B.);
D) optionally a station that comprises a centrifuge for solid-liquid separation;
E) a station that comprises the drum-dryer for solvent evaporation from a liquefied form and an extruder for extrusion of the detached drum-dryer dried film for the production of polymer pellets;

wherein the plastic waste recycling plant has a transfer system that transfers materials from each station to the next in the above listed order.

Optional stations are not implemented in some embodiments and if they are not, the transfer system transfers to the next station that is implemented. Also additional stations that are not described explicitly may be implemented.

In some embodiments said target polymer is low-density polyethylene (LDPE) and said solvent is n-heptane.

Preferably the solvent for the target polymer comprises at least 80% by weight of organic solvent, in particular at least 90% by weight of organic solvent, in particular preferred at least 95% by weight of organic solvent. The content of water in said solvent—if any—is preferably below 20% by weight, in particular below 10% by weight. In some embodiments the suspension or solution may also comprise a solvent with the above described composition.

Preferably the solvent for the target polymer comprises at least 60% by weight of organic solvent, in particular at least 80% by weight of organic solvent, in particular preferred at least 90% by weight of organic solvent. The content of water in said solvent—if any—is preferably below 40% by weight, in particular below 20% by weight, better below 10% by weight. In some embodiments the suspension or solution may also comprise a solvent with the above described composition.

In one embodiment, the method is a post-treatment step of a solvent-based recycling process for recycling plastic waste. In one embodiment, the method is a post-treatment step of a solvent-based recycling process for recycling plastic waste.

In one embodiment, the method is for recycling plastic waste and is carried out in a plastic waste recycling plant.

In some embodiments, the solvent removed from the dissolved target polymer is at least partially reused for dissolving target polymer to provide more suspension or solution comprising the dissolved target polymer. In some embodiments the solvent for reuse is purified by evaporation of the solvent and condensation and/or by distillation, wherein impurities are removed by evaporation and the solvent remains. Often the best approach depends on the boiling point of the solvent. However, in some embodiments purification is not necessary and the solvent may be reused directly, preferably if the same target polymer is targeted in subsequent rounds of dissolving polymers.

In some embodiments, the concentrated target polymer obtained in the above mentioned step ii) has the consistency of a gel. It may be then called a target polymer gel.

In some embodiments polymer pellets are formed by plastic extrusion. In some embodiments, products such as foils, pipes, bottles, pallets, lawn grids or building materials for houses are formed from said pellets or directly from concentrated target polymer obtained by blow molding, extrusion, pressing and/or injection molding.

In some embodiments the method comprises forming a polymer melt prior to extrusion and/or forming pellets or products using a pellet cutter after extrusion. Residual solvent is more efficiently removed from such a polymer melt.

In some embodiments separating said target polymer from the solution means that at least 50% by weight, in particular at least 75% by weight, preferably at least 90% by weight of the solvent is removed. In some embodiments at least 99% by weight of the solvent is removed.

In some embodiments of the method, wherein the method is for recycling plastic waste, at least 50% by weight, preferably at least 80%, by weight in particular 90% by weight, of the plastic waste is plastic, wherein said plastic also includes the target polymer. In some embodiments at least 50% by weight, preferably at least 80%, by weight in particular 90% by weight, of the plastic waste is the target polymer. In some embodiments at least up to 10% by weight, preferably up to 20% by weight, in particular up to 50% by weight of the plastic waste is plastic.

In a preferred embodiment the plastic waste is made to at least 80% by weight, preferably to at least 90% by weight, of said target polymer, in particular a single polymer or a mixture of two or three polymers.

Alternatively or additionally according to some embodiments providing a suspension or solution comprising a target polymer in accordance with step i) may be preceded by washing of plastic waste prior to insertion of the plastic waste into the solvent, e.g. washing with water. Washing removes some impurities. In some embodiments washing is performed by means of contacting of said material with a liquid to produce a suspension with subsequent purifying the obtained suspension, in particular by means of mechanical solid-liquid separation. In some embodiments said liquid is water. In some embodiments washing may comprise washing with water at an average temperature of more than 40° C., in particular more than 80° C. Also washing with water may be a conducted using a friction washer, in particular wherein a rotor transports plastic waste and/or water is transported in opposite direction to the plastic waste. Friction by rotors and water remove impurities. In some embodiments there is no such step with a friction washer and the shredded plastic waste is used directly. This may be the case if plastic waste from post-industrial residues is recycled. With plastic waste from consumer products often said washing step is advantageous.

According to some embodiments, providing a suspension or solution comprising the target polymer in accordance with step i) is achieved by downsizing plastic waste comprising the target polymer prior to insertion of said plastic material into said solvent or said mixture of solvents. Downsizing improves speed and/or completeness of dissolving of the target polymer, if the target polymer is obtained from plastic waste. In one embodiment, downsizing is shredding or cutting, or combinations thereof. Devices for downsizing plastic waste are known in the state of the art.

In some embodiments said plastic waste contains polyethylene (PE) and aluminum, preferably polyethylene, aluminum and paper. In some embodiments at least 60% by weight, in particular at least 80% by weight, preferably at least 90% by weight, of the plastic waste consists of said materials.

In some embodiments the plastic waste is at least partially obtained from packaging materials and/or foils. In some embodiments at least 60% by weight, in particular at least 80% by weight, preferably at least 90% by weight, of the plastic waste consists of packaging materials and/or foils.

In some embodiments said plastic waste is at least partially obtained from car parts. In some of said embodiments at least 60% by weight, in particular at least 80% by weight, preferably at least 90% by weight, of the plastic waste consists of car parts.

In some further embodiments the plastic waste comprises at least one type of object selected from a group consisting of cans, cups, foils, collapsible tubes, plastic bags. In some embodiments the plastic waste is mixed waste comprising at least two or three types of objects selected from a group consisting of cans, cups, foils, collapsible tubes, plastic bags. Said types of objects preferably constitute at least 20% by weight, in particular at least 40% by weight, preferably at least 60% by weight, of the total weight of said plastic waste. Other types of plastic waste or any other plastic material may be used as the source material.

The invention also relates to the use of a method for solvent-based recycling plastic material comprising at least one target polymer with an integrated extraction step, preferably for recycling of plastic waste, in particular municipal solid waste, preferably for the type and/or composition of plastic waste that is described in this disclosure. Thus, the method of the present invention can be advantageously used for plastic waste recycling. It will be appreciated, however, that other applications for processing plastic material may be envisioned.

The vessel comprises a solvent and/or an agitator for stirring the waste. The agitator may be connected to said vessel and/or it may be disposed in said vessel. The vessel may in some embodiments be a tank, in particular a closed tank. The vessel may be a tank with a volume of 1 $m^3$ to 100 $m^3$, in particular of 5 $m^3$ to 50 $m^3$, in particular preferred of 20 $m^3$ to 40 $m^3$.

Preferably, the plastic waste recycling system is adapted for implementing the method as described above.

Preferably, the vessel comprises an organic solvent for dissolving plastic waste at least partially.

In one embodiment, the vessel comprises a mixture of solvents, comprising at least one organic solvent for dissolving plastic waste at least partially.

Any devices that are used for the method as described above may preferably be also part of the plastic waste recycling system.

The invention also relates to the use of the above described plastic waste recycling system for implementing the method as described above.

In some embodiments only a single thermoplastic target polymer is present. In other embodiments a blend of thermoplastic target polymers is produced and may be used for production of pellets.

In some embodiments the above mentioned steps i) and/or ii) and/or iii) and/or iv) and/or v) and/or vi) are conducted in an environment containing less than 15% by weight of oxygen, in particular less than 5% by weight of oxygen, preferably less than 1% by weight of oxygen, in particular within the liquid and/or gaseous phase. Not all steps have to contain a gaseous and a liquid phase environment.

In some embodiments the solvent that is obtained after solvent removal is at least partially reused for dissolving target polymer with the objective to provide more suspension or solution comprising the dissolved target polymer in accordance with step i). In some embodiments, the solvent for reuse is purified by evaporation of the solvent and condensation and/or by distillation, wherein impurities are removed by evaporation and the solvent remains. Often the best approach depends on the boiling point of the solvent. However, in some embodiments purification is not necessary and the solvent may be reused directly, without evaporation of the solvent and condensation and/or by distillation, wherein optionally the solvent purification for solvent reuse in subsequent recycling is omitted if the dissolved target polymer used in a previous cycle of size classification is identical to the dissolved target polymer in a subsequent cycle of size classification, wherein a cycle of size classification consists of the provision of the suspension or solution comprising the target polymer, the delivery of the suspension or solution comprising the target polymer to an extruder, the size classification of the suspension or solution comprising the target polymer in an extruder comprising a size classification unit, optionally degassing using a degassing unit, and solvent retrieval by a solvent retrieval unit.

The solvent retrieval unit collects the solvent, and optionally, if the solvent is to be purified by evaporating and/or distilling the collected solvent using a solvent purification unit, passes it to said solvent purification unit.

In one embodiment, solvent removal, collection and purification are a continuous process. In one embodiment, solvent removal, collection and purification are a continuous process, wherein continuity of the process is ensured by immediate transfer of solvents from one station to the next, without the need for physical interruption. The source material may be supplied via a pump and valve to the drum dryer. The dries target polymer may be transported away by means of a screw conveyer. The evaporated solvent may be discharged in vapor form and may be recovered via a condenser.

The method may be used for at least partially removing of solvent from any kind of solution comprising the target polymer. The plastic waste may be immersed in the solvent dissolving the target polymer in said solvent. Surprisingly impurities that are present in said plastic waste do not prevent that drum-drying and/or extrusion can be efficiently conducted. Said method for recycling plastic waste is suitable for any kind of plastic waste comprising a thermoplastic target polymer.

It is possible that the plastic waste is sorted before dissolving in a solvent in and providing a target polymer in a suspension or solution, in accordance with the above mentioned step i), may comprise sorting said plastic waste. However, in some embodiments mixed plastic waste is used and little or no sorting is done.

Preferably the plastic waste recycling plant is adapted for implementing the method as described above.

Preferably the vessel comprises an organic solvent for dissolving plastic waste at least partially.

Any devices that are used for the method as described above may preferably be also part of the plastic waste recycling plant, e.g. the vessel as described for the method of the specifics of the membrane.

The invention also relates to the use of the above described plastic waste recycling plant for recycling a target polymer from plastic waste by dissolving said target polymer in a solvent comprising at least one organic solvent, and retrieval of said target polymer from the solvent comprising at least one organic solvent.

With the above context, the following consecutively numbered embodiments provide further specific aspects of the invention:

1. A continuous method for removing at least one solvent from a liquefied form comprising a dissolved target polymer, wherein said method comprises the following steps:
    evaporating at least one solvent from said liquefied form in a drum-dryer comprising at least one heated rotary drum, wherein said liquefied form contacts a shell surface of the at least one heated rotary drum at a temperature of up to 75° C. at a pressure of <500 mbar, and wherein a drum-dryer dried film comprising the target polymer is produced at the shell surface of the at least one heated rotary drum,
    detaching the drum-dryer dried film from the shell surface of the at least one heated rotary drum, and
    transferring the detached drum-dryer dried film from the drum-dryer to an extruder through a vacuum seal between the drum-dryer and the extruder.

2. The method according to embodiment 1, wherein said liquefied form contacts a shell surface of the at least one heated rotary drum at a temperature of up to 65° C. at a pressure of <300 mbar.

3. The method according to embodiment 1 or 2, wherein the continuous transfer of the detached drum-dryer dried film to the extruder is facilitated by means of a guiding mechanism that continuously directs the detached drum-dryer dried film from the drum-dryer shell surface into the extruder.

4. The method according to embodiment 3, wherein the guiding mechanism comprises the use of a guiding surface that is juxtaposed to the blade such that said guiding surface contacts and directs the detached drum-dryer dried film to the outlet opening of the drum-dryer that is downstream with the inlet opening of the extruder.

5. The method according to any one of embodiments 1 to 4, wherein the detached drum-dryer dried film contains solvents in an amount of preferably <3 wt %, more preferred <1 wt %, 6. The method according to any one of embodiments 1 to 5, wherein the liquefied form is additionally purified, in particular by means of mechanical solid-liquid separation, optionally using a centrifuge, thereby obtaining a purified liquefied form.

7. The method according to any one of embodiments 1 to 6, wherein if the drum-dryer comprises a plurality of rotary drums, the plurality of rotary drums comprises at least two counter-rotating drums constituting a linear slit along the outer shell surfaces of the counter-rotating drums, through which the liquefied form is transferred by the counter-rotation of said counter-rotating drums, thereby producing the drum-dryer dried film at the outer shell surface of the at least two counter-rotating drums.

8. The method according to embodiment 7, wherein the linear slit has a width of ≤1000 μm, preferably 100 μm to 1000 μm, more preferably <300 μm.

9. The method according to any one of embodiments 1 to 8, wherein the width of the drum-dryer dried film is up to 100% of the total drum length, preferably up to 90% of the total drum length.

10. The method according to any one of embodiments 1 to 9, wherein the drum-dryer dried film has a width of ≤1000 μm, preferably <300 μm.

11. The method according to any one of embodiments 1 to 10, wherein the inlet opening of the drum-dryer comprises a seal, and wherein the seal stabilizes the pressure of the drum-dryer and is provided by means of at least one intermediate valve, wherein the at least one intermediate valve is connected to at least one vacuum pump.

12. The method according to any one of embodiments 1 to 11, wherein the extruder is a screw extruder.

13. The method according to any one of embodiments 1 to 12, wherein the liquefied form is a polymer suspension, melt or solution.

14. The method according to any one of embodiments 1 to 13, wherein the liquefied form is a polymer suspension or solution.

15. The method according to any one of embodiments 1 to 14, wherein the detached drum-dryer dried film is a dried gel-like polymer.

16. The method according to any one of embodiments 1 to 15, wherein heated means that the temperature of the drum or plurality of drums of the drum-dryer is 20K, preferably 10 K below the boiling point of the organic solvent, or the organic solvent with the lowest evaporation temperature in a mixture of solvents.

17. The method according to any one of embodiments 1 to 16, wherein drum speed is less than 10 rpm, preferably less than 5 rpm.

18. The method according to any one of embodiments 1 to 17, wherein the extruder is under pressure, and wherein said pressure is >30 bar, preferably >50 bar, most preferred >100 bar.

19. The method according to any one of embodiments 1 to 18, wherein the pressure in the extruder is achieved by a vacuum pumping system aided with heating.

20. The method according to any one of embodiments 1 to 19, wherein the method is for recycling plastic waste comprising a target polymer, wherein plastic waste comprising the target polymer is at least partially dissolved in the solvent comprising at least one organic solvent, in particular using an agitator and/or a heating system.

21. The method according to any one of embodiments 1 to 20, wherein dissolving of the target polymer in a solvent is conducted under temperature which is lower by more than 5 K, in particular by more than 10 K than the boiling point of said solvent, or the organic solvent with the lowest evaporation temperature in a mixture of solvents.

22. The method according to any one of embodiments 1 to 21, wherein the target polymer is a thermoplastic target polymer.

23. The method according to any one of embodiments 1 to 22, wherein the target polymer is derived from plastic material selected from the group comprising post-consumer use polymers, post-industrial use polymers and combinations thereof.

24. The method according to any one of embodiments 1 to 23, wherein the target polymer is selected from the group comprising polyolefins, polyamide (PA) and combinations thereof.

25. The method according to any one of embodiments 1 to 24, wherein the target polymer is a polyolefin.

26. The method according to any one of embodiments 1 to 25, wherein the target polymer is low-density polyethylene (LDPE).

27. The method according to any one of embodiments 1 to 26, wherein the target polymer is polypropylene (PP).

28. The method according to any one of embodiments 1 to 27, wherein the target polymer is polyamide (PA).

29. The method according to any one of embodiments 1 to 28, wherein the solvent is a single organic solvent or a mixture of solvents comprising at least one organic solvent.

30. The method according to any one of embodiments 1 to 29, wherein the solvent or mixture of solvents comprises aliphatic or aromatic hydrocarbons.

31. The method according to any one of embodiments 1 to 30, wherein the solvent or mixture of solvents comprises formic acid, acetic acid, ketones such as acetone or propanone and alcohols such as methanol or ethanol or polyols such as glycol or 2-propanol or mixtures thereof.

32. The method according to any one of embodiments 1 to 31, wherein the target polymer is low-density polyethylene (LDPE) and the solvent is selected from the group comprising alkanes, iso-alkanes and cyclic alkanes, and wherein if the solvent of LDPE is an alkane, said alkane preferably is n-heptane.

33. The method according to any one of embodiments 1 to 32, wherein the target polymer is polypropylene (PP) and the solvent is n-nonane.

34. The method according to any one of embodiments 1 to 33, wherein the target polymer is polyamide (PA) and the solvent is propylene glycol.

35. The method according to any one of embodiments 1 to 34, wherein the method is for recycling plastic waste and is carried out in a plastic waste recycling plant.

36. Plastic waste recycling plant, in particular for implementing the method according to any one of embodiments 1 to 35, comprising the following stations:
   A) optionally a station that comprises a downsizing device for plastic waste, that optionally is a cutting or shredding device for plastic waste, and optionally a plastic particle size classification device for classifying the downsized plastic waste;
   B) optionally a station for washing the downsized, optionally classified plastic waste produced in station A.);
   C) a station that comprises a vessel, wherein the vessel comprises an agitator and/or a heating system and/or an organic solvent for dissolving the at least one target polymer, optionally derived from the downsized plastic waste, optionally the classified plastic waste produced in station A.), or the washed plastic waste produced in station B.);
   D) optionally a station that comprises a centrifuge for solid-liquid separation;
   E) a station that comprises the drum-dryer for solvent evaporation from a liquefied form and an extruder for extrusion of the detached drum-dryer dried film for the production of polymer pellets;
   wherein the plastic waste recycling plant has a transfer system that transfers materials from each station to the next in the above listed order.

Definitions

Listed below are definitions of various terms used to describe this invention. These definitions apply to the terms as they are used throughout this specification and claims unless otherwise limited in specific instances either individually or as part of a larger group. Unless defined otherwise all technical and scientific terms used herein generally have the same meaning as commonly understood by one of ordinary skill in the art to which this invention belongs.

As used herein the articles "a" and "an" refer to one or to more than one (i.e. to at least one) of the grammatical object of the article. By way of example, "an element" means at least one element, i.e. an element or more than one element. This applies in particular also for "a target polymer" and "a solvent" as discussed below.

As used herein the term "average temperature" refers to a temperature that is averaged over time, preferably over the duration of the corresponding step. In a continuous system the duration of a step refers to the average time of the waste material under the conditions as described for said step. There may be location dependent variations within the solvent that can be reduced by stirring. In said case the temperature should also be averaged over said locations to determine the average temperature. With sufficient stirring the average temperature usually is only location dependent to a small degree and the average temperature can be determined by measuring in one spot for the duration of a step.

As used herein the term "peak temperature" refers to a maximum temperature that is achieved during a step. It may be determined by continuously monitoring the temperature and selecting the maximum temperature. For example with a batchwise implementation of steps the temperature may drop, e.g. when cold plastic waste is inserted into the solvent. A heating system may heat the vessel to achieve said peak temperature before the solvent is lead to the next step. In a continuous system the temperature may be constant and there often is no difference between "average temperature" and "peak temperature". There also may be location dependent variations within the solvent and in said case the temperature may be averaged over said locations (not over time) to determine the peak temperature.

As used herein the term "solvent" refers to a single solvent or a mixture of different solvents. A single solvent may facilitate recovery whereas a mixture may reduce the use of toxic solvents or accelerate dissolution of a polymer.

As used herein the term "target polymer" refers to a single polymer or a mixture of different polymers. Polymers also include copolymers and block polymers. Often a mixture of polymers cannot be avoided completely. Preferably the term "target polymer" refers to a single polymer or a mixture of different polymers that are dissolvable in the solvent and may be used for producing polymer pellets. In some instances "target polymer" refers to a mixture of one, two or three polymers as a major component, wherein impurities are possible that have a weight of less than 5% by weight compared to the total weight of the target polymer. Furthermore, use of the term "target polymer" is to be understood in the above way also when "a target polymer", "the target polymer" or "said target polymer" is mentioned unless it is explicitly stated that it is only a single polymer or a mixture of different polymers, i.e. "a target polymer" is "at least one target polymer"; "the target polymer" is "the at least one target polymer" and "said target polymer" is "said at least one target polymer" unless stated otherwise. A non-target polymer may also be a polymer that is not dissolvable in the used solvent and it may be removed by solid-liquid separation.

As used herein the term "several" refers to two, three, four or more entities, preferably two or three entities.

As used herein the term "plastic waste" refers to waste comprising plastic. Preferably plastic waste is any substance that is discarded after primary use, and/or has been discarded, e.g. because it is defective. In some embodiments the "plastic waste" is solid. In some embodiments "plastic waste" refers to municipal solid waste, in particular comprising everyday items that are discarded by the public. In some embodiments "plastic waste" refers to post-consumer use polymers, post-industrial use polymers and combinations thereof.

As used herein the term "mixed plastic waste" refers to plastic waste containing different kinds of plastic objects. Often plastic is sorted before it is used, e.g. only plastic bags are provided or only plastic foils. This usually requires a sorting of plastic. In some instances mixed plastic waste is municipal plastic waste as obtained from households, i.e. plastic bags, plastic packaging, plastic tubes and such can be mixed. It was found that mixed plastic waste can be used to produce polymer in accordance with the invention without need of collection in groups of identical materials and/or objects.

As used herein the term "alkanes" refers to straight chain hydrocarbons having from 5 to 20 carbon atoms, typically from 5 to 12 carbon atoms. Examples include, but are not limited to n-hexane, n-heptane, n-octane and n-nonane.

As used herein the term "iso-alkanes" refers to branched chain hydrocarbons having from 5 to 20 carbon atoms, typically from 5 to 12 carbon atoms. Examples include, but not limited to isooctane.

As used herein the term "cyclic alkanes" refers to cyclic, saturated hydrocarbons wherein each of the atoms forming the ring (i.e. skeletal atoms) is a carbon atom. Cyclic alkanes may be optionally substituted by an alkyl group having from 1 to 4 carbon atoms. Examples include, but not limited to cyclohexane, methylcyclohexane.

As used herein the term "ketones" refers to organic compounds having a carbonyl group linked to a carbon atom. Examples include, but not limited to acetone, butanone.

As used herein the term "organic acids" refers to organic compounds having a functional group of formula $C(=O)OH$. Examples include, but not limited to formic acid, acetic acid.

The "number average molecular weight" is preferably the total weight of the respective polymer sample, e.g. the target polymer, divided by the number of polymer molecules in the sample. The "average molecular mass" may be determined according to ISO 16014-1:2012 and/or ISO 16014-2:2012, preferably by ISO 16014-1:2012.

The terms "virgin polymer", "virgin-like" or "virgin-grade polymer" refer to different grades of purity of a solid polymer, or plastic product comprising a certain target polymer. In the context of the present invention, the term "virgin polymer" or "virgin-grade polymer" refers to ≥95 wt %, preferably ≥99 wt %, most preferred 100 wt % of target polymer. The term "virgin-like polymer" refers ≥90 wt %, preferably ≥95 wt %, most preferred ≥99 wt % target polymer.

In the context of the present invention "impurity" refers to any molecule or entity that is not meant to be a part of the product produced by the method that is subject matter of the present invention. More specifically, if the product is meant to be a polymer, then anything apart from the polymer is classified as an impurity. If the product is meant to be a polymer with certain additives, then anything apart from the polymer with certain additives is classified as an impurity. Another example would be if the product is meant to contain a polymer of certain length, and/or branching, or a certain distribution thereof, optionally further comprising certain additives, then anything that does not form part of polymer of certain length, and/or branching, or a certain distribution thereof, optionally further comprising certain additives, is to be considered as "impurity". The definition as to what is considered an impurity thus depends on what the person skilled in the art does not consider a defining constituent of the particular product.

"Gastight" means that at least 95%, preferably at least 99%, most preferred 100% of volume remains enclosed in a particular enclosure that is sealed from the surrounding environment. In the context of the present invention, a pipe comprising an organic solution or suspension with a highly volatile and flammable solvent may be enclosed in a gastight enclosure with low oxygen concentration, in order to prevent contact with the oxygen of the atmosphere that is surrounding said enclosure, in order to reduce the risk of combustion.

An "extruder" means any plastic extruder known from the prior art. This may also include degassing extruders. However, if the term "degassing extruder" is used, then plastic extruders without the capability for degassing are excluded. Degassing extruders are also known from the prior art.

The term "downsizing" refers to any process that reduces the size of a physical entity. In the context of the present invention, downsizing specifically refers to the size reduction of plastic material, and in some examples comprises shredding or cutting of plastic material.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding European application No. 20190065.1, filed Aug. 7, 2020, are incorporated by reference herein.

EXAMPLES

Example 1 a) 3.7 kg of n-heptane were filled into a vessel and heated to a temperature of 95° C.
b) 0.1 kg of LDPE granulates were added to the vessel.
c) The mixture was stirred for 30 minutes to obtain a solution of LDPE in n-heptane.
d) The vacuum pump was switched on to create a pressure of 0.05 bar in the vacuum drum dryer.
e) The drums were heated to a temperature of 80° C. and adjusted to a rotation speed of 1.5 rpm.
f) The polymer solution was dosed via the dosing pump between the two drums with a spacing of 5 mm Evaporation of n-heptane started.
g) The evaporated heptane was condensed in the condenser and transferred into the solvent tank. 3.4 kg of the condensed n-heptane were collected.
h) The solid polymer was sharped off the drums to obtain a detached drum-dryer dried film with the residual solvent concentration of 4 wt %.
i) The screw conveyor pulled in the drum-dryer dried film and fed it to the extruder.
j) The polymer was melted in the extruder at a temperature of 220° C.
k) The material was pelletized in a pelletizing unit to obtain 85 g of LDPE granulates.

Example 2 a) 26.6 kg of methyl cyclohexane were filled into a vessel and heated to a temperature of 95° C.
b) 0.8 kg of LDPE granulates were added to the vessel.
c) The mixture was stirred for 30 minutes to obtain a solution of LDPE in methyl cyclohexane.
d) The vacuum pump was switched on to create a pressure of 0.05 bar in the vacuum drum dryer.
e) The drums were heated to a temperature of 65° C. and adjusted to a rotation speed of 2.5 rpm.
f) The polymer solution was dosed via the dosing pump between the two drums with a spacing of 5 mm. Evaporation of methyl cyclohexane started.
g) The evaporated methyl cyclohexane was condensed in the condenser and transferred into the solvent tank. 23.7 kg of the condensed methyl cyclohexane were collected.
h) The solid polymer was sharped off the drums to obtain a detached drum-dryer dried film with the residual solvent concentration of 4 wt %.
i) The screw conveyor pulled in the drum-dryer dried film and fed it to the extruder.
j) The polymer was melted in the extruder at a temperature of 220° C.
k) The material was pelletized in a pelletizing unit to obtain 640 g of LDPE granulates.

Figure 1:
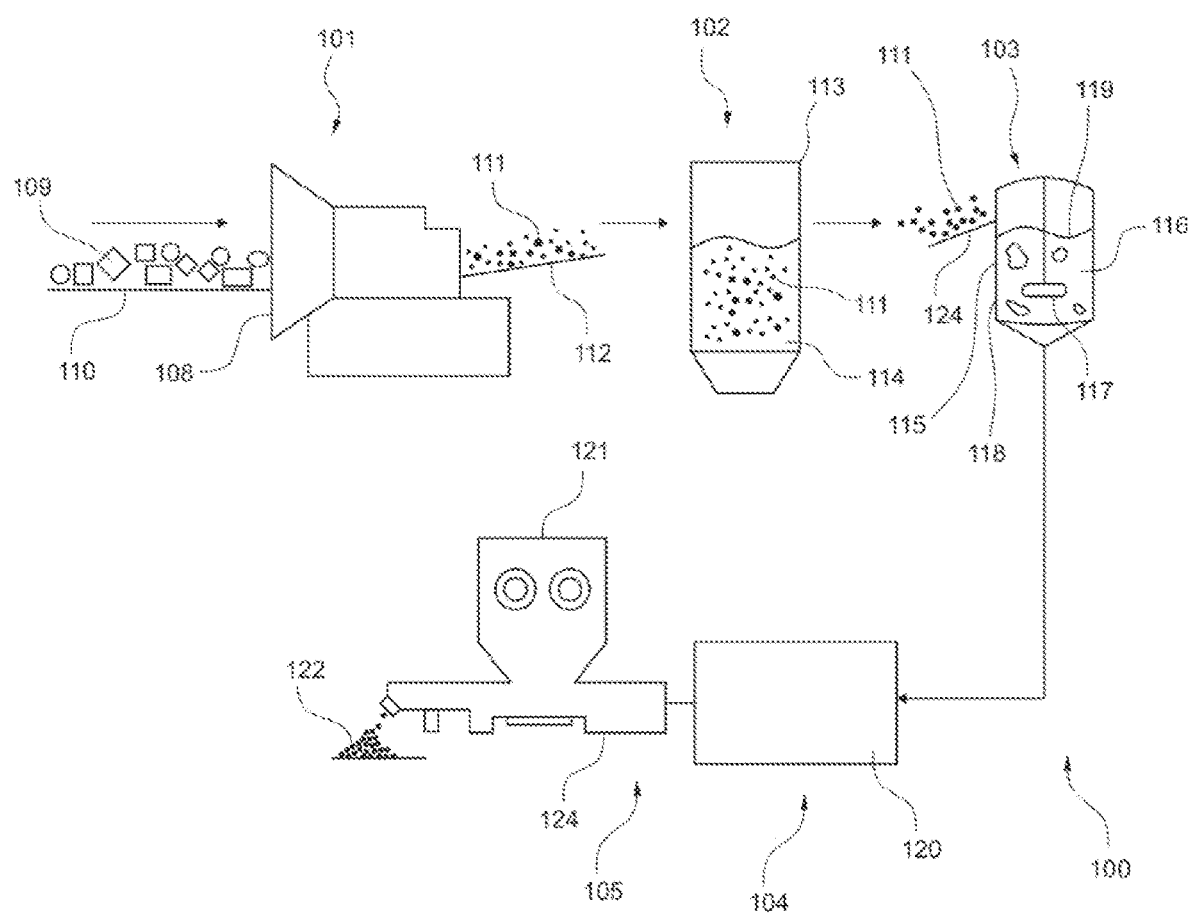
FIG. 1 shows a plastic waste recycling plant 100 comprising several stations. The plastic waste recycling plant is only a possible implementation for the method. Also plastic production plants for producing polymers by polymerization may use the described method for solvent-based recycling a plastic material comprising at least one target polymer with an integrated extraction step. A shredding device 108 for plastic waste 109 is comprised in a first station 101. Said plastic waste may be transported by a first conveyor belt 110 into the shredding device 108 and by a second conveyor belt 112 shredded plastic wastes 111 may be transported out of the shredding device 108. Preferably in some embodiments the plastic waste recycling plant 100 comprises a second station 102 for washing the shredded plastic waste 111. Said second station 102 may comprise a container 113 with a washing liquid 114 such as water, wherein shredded plastic waste 111 is purified. The purified shredded plastic waste 111 may be transported, e.g. by another conveyor belt 124, to a third station 103 comprising a vessel 118, wherein the vessel 118 comprises an agitator 117 and/or a heating system 115, e.g. as part of the vessel 118. In some embodiments the shredded plastic waste 111 is directly transported from the first station 101 to the third station 103. The third station preferably contains a solvent 116, wherein the target polymer is dissolved in said solvent thus forming a solution or a suspension 119. A fourth station 104 may comprise a centrifuge 120 for solid-liquid separation. A fifth station 105 comprises a drum-dryer for solvent evaporation from a liquefied form comprising a dissolved target polymer integrated with an extruder 121 for extrusion of the solvent-free liquefied polymer mass comprising the target polymer optionally for the production of polymer pellets 122.
Figure 2:
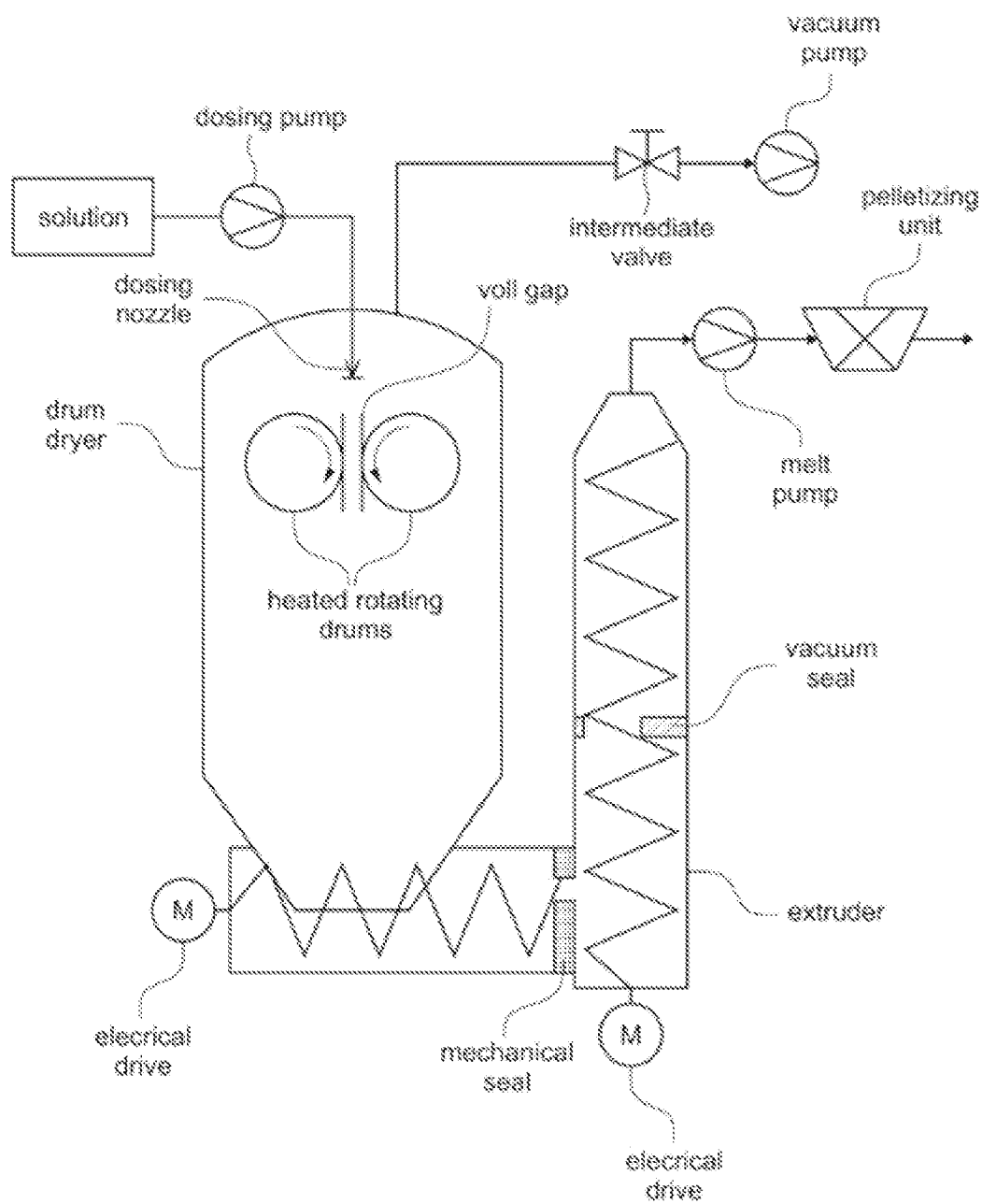
FIG. 2 shows the unit 121 in more detail.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A continuous method for removing at least one solvent from a liquefied form comprising a dissolved target polymer, wherein said method comprises the following steps:
    evaporating at least one solvent from said liquefied form in a drum-dryer comprising at least one heated rotary drum, wherein said liquefied form contacts a shell surface of the at least one heated rotary drum at a temperature of up to 75° C. at a pressure of <500 mbar, and wherein a drum-dryer dried film comprising the target polymer is produced at the shell surface of the at least one heated rotary drum,
    detaching the drum-dryer dried film from the shell surface of the at least one heated rotary drum, and
    transferring the detached drum-dryer dried film from the drum-dryer to an extruder through a vacuum seal between the drum-dryer and the extruder,
    wherein continuous transfer of the detached drum-dryer dried film to the extruder is facilitated by means of a guiding mechanism that continuously directs the detached drum-dryer dried film from the drum-dryer shell surface into the extruder.

2. The method according to claim 1, wherein said liquefied form contacts a shell surface of the at least one heated rotary drum at a temperature of up to 65° C. at a pressure of <300 mbar.

3. The method according to claim 2, wherein the guiding mechanism comprises the use of a guiding surface that is juxtaposed to the blade such that said guiding surface contacts and directs the detached drum-dryer dried film to the outlet opening of the drum-dryer that is downstream with the inlet opening of the extruder.

4. The method according to claim 1, wherein the detached drum-dryer dried film contains solvents in an amount of <3 wt %.

5. The method according to claim 1, wherein the liquefied form is additionally purified, in particular by means of mechanical solid-liquid separation, optionally using a centrifuge, thereby obtaining a purified liquefied form.

6. The method according to claim 1, wherein if the drum-dryer comprises a plurality of rotary drums, the plurality of rotary drums comprises at least two counter-rotating drums constituting a linear slit along the outer shell surfaces of the counter-rotating drums, through which the liquefied form is transferred by the counter-rotation of said counter-rotating drums, thereby producing the drum-dryer dried film at the outer shell surface of the at least two counter-rotating drums.

7. The method according to claim 6, wherein the linear slit has a width of ≤1000 μm.

8. The method according to claim 1, wherein the width of the drum-dryer dried film is up to 100% of the total drum length.

9. The method according to claim 1, wherein the drum-dryer dried film has a width of ≤1000 μm.

10. The method according to claim 1, wherein the inlet opening of the drum-dryer comprises a seal, and wherein the seal stabilizes the pressure of the drum-dryer and is provided by means of at least one intermediate valve, wherein the at least one intermediate valve is connected to at least one vacuum pump.

11. The method according to claim 1, wherein the extruder is a screw extruder.

12. The method according to claim 1, wherein the liquefied form is a polymer suspension, melt or solution.

13. The method according to claim 1, wherein the method is for recycling plastic waste and is carried out in a plastic waste recycling plant.

14. A plastic waste recycling plant, in particular for implementing the method according to claim 1, comprising the following stations:
    A) optionally a station that comprises a downsizing device for plastic waste, that optionally is a cutting or shredding device for plastic waste, and optionally a plastic particle size classification device for classifying the downsized plastic waste;
    B) optionally a station for optionally washing downsized, optionally classified, plastic waste produced in station A);
    C) a station that comprises a vessel, wherein the vessel comprises an agitator and/or a heating system and/or an organic solvent for dissolving the at least one target polymer, optionally derived from downsized, optionally classified, plastic waste produced in station A), or optionally derived from washed plastic waste produced in station B);
    D) optionally a station that comprises a centrifuge for solid-liquid separation;
    E) a station that comprises the drum-dryer for solvent evaporation from a liquefied form and the extruder for extrusion of the detached drum-dryer dried film for production of polymer pellets, and further comprising the guiding mechanism that continuously directs the detached drum-dryer dried film from the drum-dryer shell surface into the extruder;
wherein the plastic waste recycling plant has a transfer system that transfers materials from each station to the next in the above listed order.

15. The method according to claim 1, wherein the detached drum-dryer dried film contains solvents in an amount of <1 wt %.

16. The method according to claim 6, wherein the linear slit has a width of 100 μm to 1000 μm.

17. The method according to claim 6, wherein the linear slit has a width of <300 μm.

18. The method according to claim 1, wherein the width of the drum-dryer dried film is up to 90% of the total drum length.

19. The method according to claim 1, wherein the drum-dryer dried film has a width of <300 μm.

20. The plastic waste recycling plant according to claim 14, wherein said method includes:
    A) the station that comprises the downsizing device for plastic waste, that optionally is a cutting or shredding device for plastic waste, and optionally the plastic particle size classification device for classifying the downsized plastic waste; and
    wherein in station C) the at least one target polymer is derived from the downsized plastic, optionally classified, waste produced in station A).

* * * * *